UNITED STATES PATENT OFFICE.

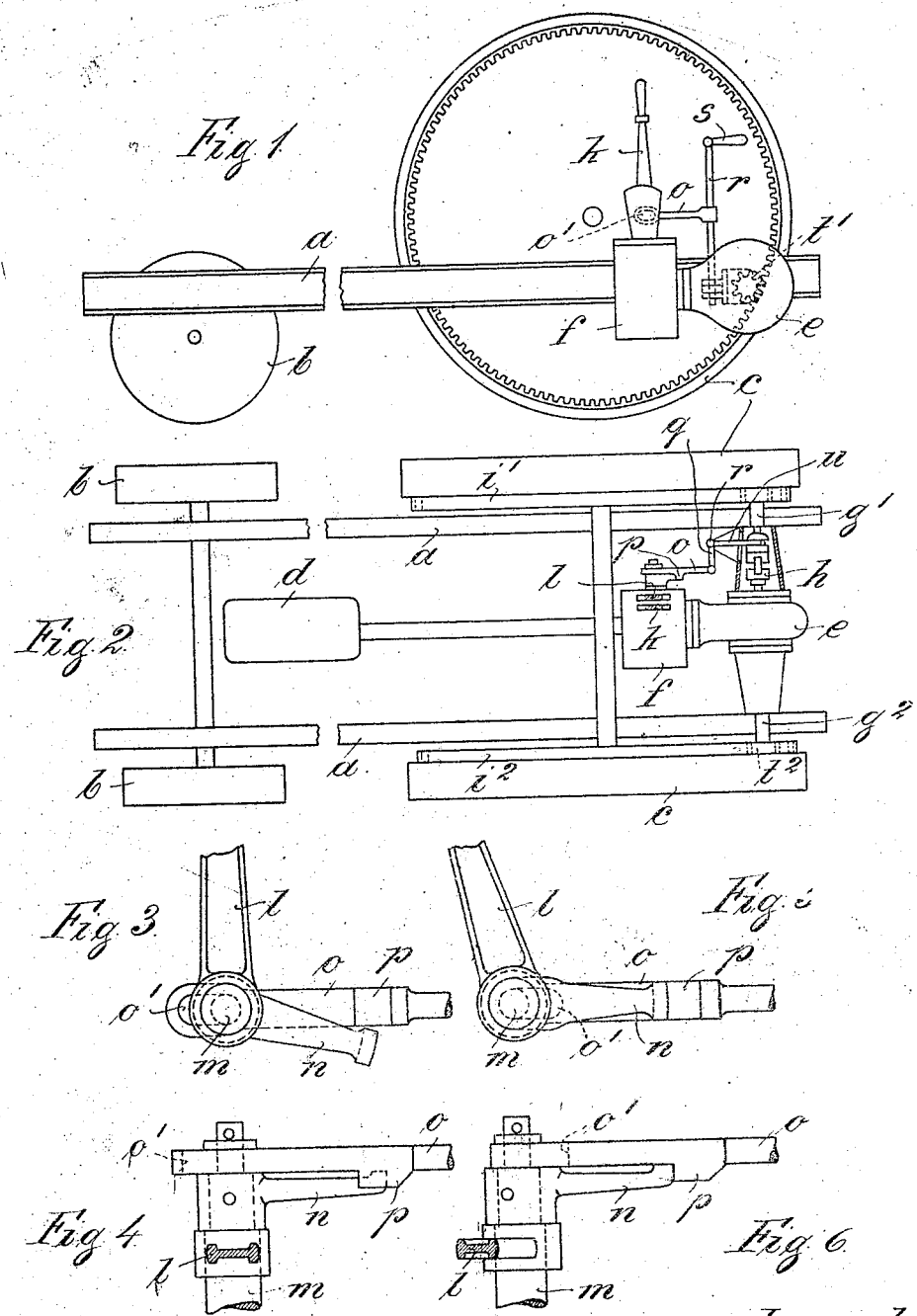

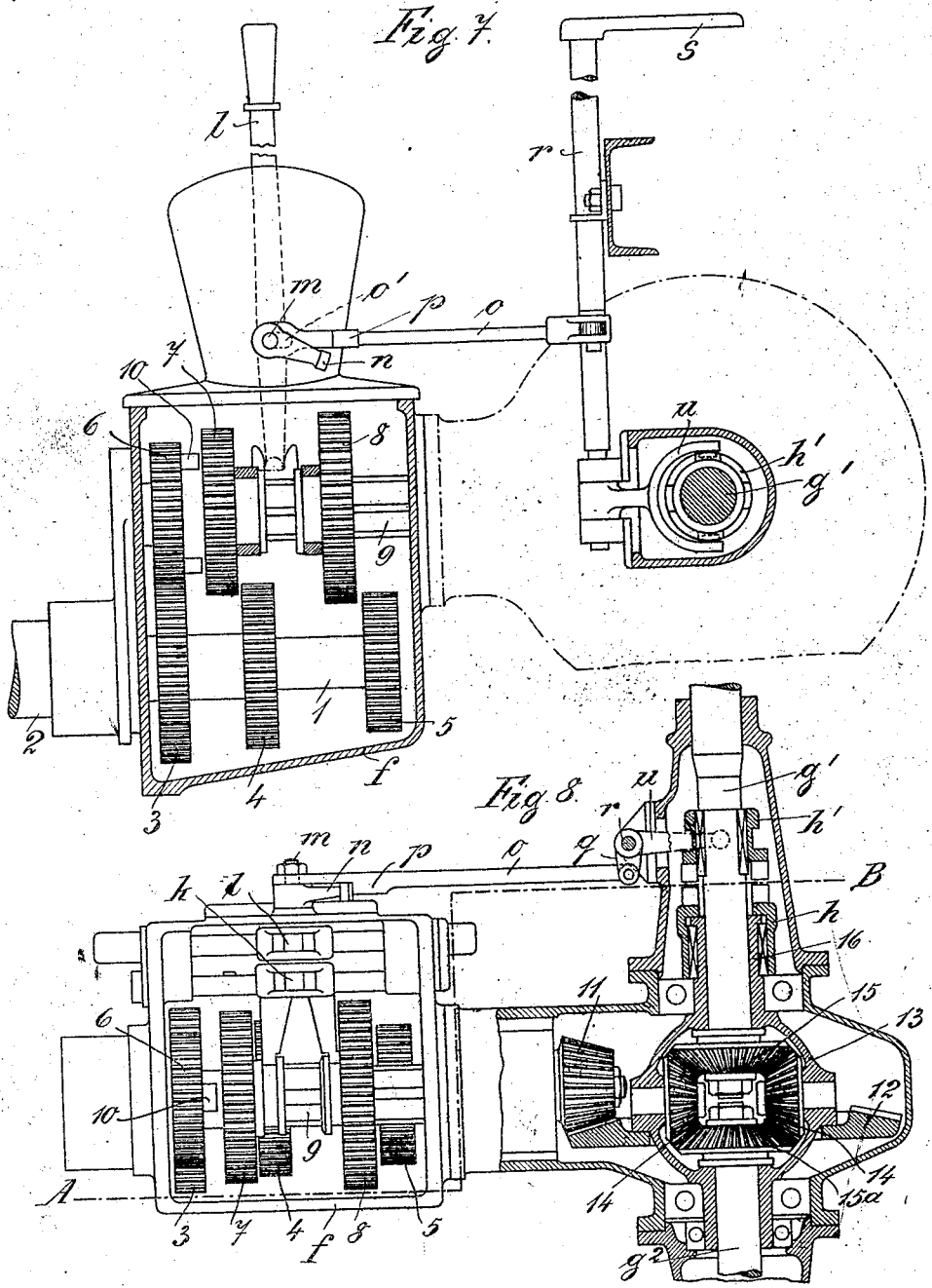

KARL HEINRICH WILHELM LUDWIG SECK, OF MANNHEIM, GERMANY, ASSIGNOR TO THE FIRM OF HEINRICH LANZ, OF MANNHEIM, GERMANY.

DRIVING MECHANISM FOR MOTOR-DRIVEN CULTIVATORS.

1,085,362.

Specification of Letters Patent. Patented Jan. 27, 1914.

Application filed January 17, 1913. Serial No. 742,544.

*To all whom it may concern:*

Be it known that I, KARL HEINRICH WILHELM LUDWIG SECK, subject of the German Emperor, residing at 22 Augusta Anlage, Mannheim, in the German Empire, have invented certain new and useful Improvements in Driving Mechanism for Motor-Driven Cultivators, of which the following is a specification.

This invention relates to driving mechanism for motor-driven agricultural cultivators or the like of the type in which the driving wheels are driven from co-axial counter-shafts driven in turn from the motor shaft through differential and change speed gearing, the counter-shafts being adapted to be coupled together so as to rotate in unison when required, such as when one of the wheels skids upon the ground, the object thereof being to transmit the whole of the power to the other wheel.

The object of the present invention is to simplify the construction and to reduce the cost of the driving mechanism, and for this purpose mechanism is provided for preventing the coupling of the driving wheels when the lowest or one of the lower speeds of the change speed gearing is in gear and for preventing the said speed or speeds from being put into gear when the wheels are coupled.

In order that the invention may be more clearly understood, reference is made to the accompanying drawings whereon one embodiment of the invention is shown by way of example.

Figure 1 is a somewhat diagrammatic side view of a motor-driven cultivator having my invention applied, and Fig. 2 is a plan view thereof. Figs. 3 and 4 are side and plan views respectively showing one position of the locking mechanism, while Figs. 5 and 6 are corresponding views of the locking mechanism in its other position. Fig. 7 is a side view in section on the line A—B of Fig. 8, and Fig. 8 is a sectional plan view of the change speed and differential gear.

The vehicle frame *a* is mounted on front wheels *b* and rear driving wheels *c*, the latter being driven from the motor *d* through change speed and differential gear. The change speed gearing is contained in a casing *f* and comprises (Figs. 7 and 8) a shaft 1 in line with and rotating in unison with the motor shaft 2 and carrying three gear wheels 3, 4 and 5 adapted to mesh with gear wheels 6, 7 and 8 mounted upon a shaft 9. The wheel 6 rotates loosely on the shaft 9 while the wheels 7 and 8 are splined thereon and adapted to be moved on the shaft 9 by means of levers *k* and *l* respectively. In one position, the wheel 7 is adapted to engage projections 10 on the wheel 6 and thus rotate in unison therewith. When the wheels 5 and 8 are in gear, the lowest speed is transmitted to the shaft 9 from the motor shaft 2. When the wheels 6 and 7 are clutched together, the highest speed is obtained, while when the wheels 4 and 7 are in gear, an intermediate speed is obtained. It will thus be seen that the lever *l* is adapted to put the lowest speed into or out of gear while the lever *k* is adapted to put the intermediate or highest speeds into gear.

The shaft 9 carries externally a bevel wheel 11 in gear with a crown wheel 12 fixed to a casing 13 within which is mounted the differential gear comprising planet wheels 14 carried by the casing 13 and gear wheels 15 and 15ª in gear therewith and mounted on the ends of two co-axial counter-shafts *g'* and *g²* carrying pinions *t'* and *t²* respectively in gear with internally toothed wheels *i'* and *i²* on the driving wheels *c*.

The casing 13 of the differential gear has a boss 16 surrounding the counter-shaft *g'*, this boss 16 carrying one half *h* of a claw clutch, the other half *h'* of which is splined upon the shaft *g'* and adapted to be moved thereon by means of a fork *u* carried at the lower end of a vertical rotatable spindle *r* having an operating handle *s*.

It will be readily understood that when the two halves *h* and *h'* of the clutch are in engagement, the two counter-shafts *g'* and *g²* will rotate in unison and they will only be driven through the differential gear 14, 15 and 15ª when the clutch is out of engagement. Any other suitable type of clutch may, of course, be employed.

The pivotal shaft *m* of the lever *l* extends through the change speed gear casing *f* and carries externally a locking lever *n*. The pivotal shaft *m* also serves to guide a rod *o* slotted at *o'* so as to embrace the shaft *m* and having a projecting nose *p* adapted to act with the locking lever *n* which turns with the lever *l*. The sliding rod *o* is articulated to one end of a link *q* secured at its other end to the vertical rotatable spindle *r*.

It will now be seen that when the halves $h$ and $h'$ of the clutch are put into engagement, the nose $p$ will be moved toward the shaft $m$ to such an extent that it lies in the path of the locking lever $n$ and will thus prevent the lever $l$ from being moved into operative position to put the lowest speed of the change speed gearing into gear, as shown in Figs. 3 and 4. If therefore it is desired to drive the driving wheels $c$ through the lowest speed it is necessary to first of all disengage the claw clutch in order to release the operating lever $l$, so that the total power transmitted through the lowest speed of the gearing will be distributed over both of the counter-shafts $g'$ and $g^2$. If, on the other hand, the lowest speed of the gearing is in gear, the operating lever $l$ will take up the position illustrated in Figs. 5 and 6 in which the locking lever $n$ will lie in the path of the nose $p$, thus preventing the movement of the nose $p$ toward the shaft $m$ and thus preventing the counter-shafts $g'$ and $g^2$ from being coupled together to rotate in unison by putting the clutch $h$ into gear. The clutch may be put into gear from the driver's seat, when the machine is not being driven through the lowest speed of the gearing, by means of the handle $s$ located near the driver's seat. This arrangement enables the mechanism to be of lighter construction, while at the same time efficient security against damage to the mechanism through careless operation of the operating levers of the change speed gearing or clutch is afforded.

Although the invention has been described with reference to the accompanying drawings as applied to the locking only of the operating lever $l$ controlling the lowest speed, it will be readily understood that the mechanism may be also adapted to lock the operating lever controlling the next lower speeds, should this be found necessary.

I claim:—

1. Driving mechanism for the driving wheels of a motor-driven cultivator comprising a motor-driven shaft, co-axial shafts arranged to drive said driving wheels, differential and change speed gearing for driving said co-axial shafts from said motor-driven shaft, a clutch for coupling said co-axial shafts to rotate in unison, and mechanism for permitting the engagement of said clutch only when one of the higher speeds of said change speed gearing is in operative position and for permitting only said higher speeds to be put into operation when said clutch is in engagement.

2. Driving mechanism for the driving wheels of a motor-driven cultivator comprising a motor-driven shaft, co-axial shafts arranged to drive said driving wheels, differential and change speed gearing for driving said co-axial shafts from said motor-driven shaft, a clutch for coupling said co-axial shafts to rotate in unison, and mechanism for preventing the engagement of said clutch when the lowest speed of said change speed gearing is in operative position and for preventing said lowest speed from being put into operative position when said clutch is in engagement.

3. Driving mechanism for the driving wheels of a motor-driven cultivator comprising a motor-driven shaft, co-axial shafts arranged to drive said driving wheels, differential and change speed gearing for driving said co-axial shafts from said motor-driven shaft, operating levers for the speeds of said change speed gearing, a clutch for coupling said co-axial shafts to rotate in unison, manipulating mechanism for said clutch, and locking mechanism intermediate said clutch manipulating mechanism and the operating lever of the lowest speed of said change speed gearing for preventing the manipulation of said clutch when said lowest speed operating lever is in the operative position and for preventing the movement of said lowest speed operating lever to operative position when said clutch is in engagement.

4. Driving mechanism for the driving wheels of a motor-driven cultivator, comprising a motor-driven shaft, co-axial shafts arranged to drive said driving wheels, differential and change speed gearing for driving said co-axial shafts from said motor-driven shaft, operating levers for the speeds of said change speed gearing, a clutch for coupling said co-axial shafts to rotate in unison, manipulating mechanism for said clutch, a slidable bar connected to and adapted to be slid by said manipulating mechanism, a nose on said bar, and a locking lever turning with the operating lever of the lowest speed of said change speed gearing and adapted to be turned into or out of line with said nose and be engaged thereby.

In testimony whereof I have affixed my signature in presence of two witnesses.

WILLY SECK.

Witnesses:
H. MEYER.
JOSEPH HEIFFER.